United States Patent [19]

Smith et al.

[11] 3,909,911

[45] Oct. 7, 1975

[54] METHOD FOR REMOVING INSULATING AND SHIELDING MATERIALS FROM FLAT CONDUCTORS, CIRCUITS AND COMPONENTS

[75] Inventors: Michael C. Smith, Costa Mesa; Hal W. Smith, Jr., Balboa Island, both of Calif.

[73] Assignee: Orthodyne Electronics, Costa Mesa, Calif.

[22] Filed: Apr. 30, 1973

[21] Appl. No.: 355,975

[52] U.S. Cl. .......... 29/427; 29/624; 29/628; 30/164.9; 81/9.51

[51] Int. Cl. .......... B23p 19/02

[58] Field of Search .......... 81/9.51; 83/4, 5, 12, 13, 83/701; 29/427, 628, 203 R; 172/40; 173/49, 31; 30/169, 272, 164.9; 15/93; 90/15

[56] References Cited

UNITED STATES PATENTS

| | | | |
|---|---|---|---|
| 2,421,319 | 5/1947 | Ehret | 81/9.51 |
| 2,951,286 | 9/1960 | Mann | 30/169 |
| 3,086,288 | 4/1963 | Balamuth et al. | 30/272 |
| 3,261,239 | 7/1966 | Moons et al. | 81/9.51 |
| 3,385,140 | 5/1968 | Carpenter et al. | 51/80 |
| 3,468,384 | 9/1969 | Bodine | 30/272 R |
| 3,526,219 | 9/1970 | Balamuth | 30/123.3 |
| 3,604,520 | 9/1971 | Shatto | 30/169 |
| 3,659,332 | 5/1972 | Morrone | 29/203 D |

*Primary Examiner*—C. W. Lanham
*Assistant Examiner*—James R. Duzan
*Attorney, Agent, or Firm*—Richard L. Gausewitz

[57] ABSTRACT

The insulating and/or shielding materials in a flat cable, etc., are removed by providing an ultrasonically excited tool, applying pressure to the tool in order to cause the tip thereof to penetrate to the surface of the flat conductor, and thereafter moving the tool tip and the conductor relative to each other in a skiving motion which pares away the insulating and/or shielding material. The ultrasonic motion of the tool tip is in a plane which is generally parallel to the conductor surface. Furthermore, the end surface of the tool tip is substantially flat, and engages (or closely approaches) the conductor surface in a flatwise relationship. The described, and other, factors permit removal of the insulating and/or shielding substances without damaging the conductor. Furthermore, any desired length of cable may be effectively and rapidly stripped, without employing large amounts of pressure or power.

33 Claims, 8 Drawing Figures

METHOD FOR REMOVING INSULATING AND SHIELDING MATERIALS FROM FLAT CONDUCTORS, CIRCUITS AND COMPONENTS

BACKGROUND OF THE INVENTION

1. Field of the Invention

This invention relates to the field of removing insulating and/or shielding layers from the flat conductors incorporated in flat cables and simliar flat electrical components of circuits, in order that desired electrical connections may be made. The word "flat" is employed herein despite the fact that the cable, etc., may in some instances be twisted or curved. The word "insulating" is employed herein despite the fact that, in some instances, the primary purpose of an insulating layer is to effect a bond.

2. Description of Prior Art

Flat cables, wherein the parallelrelated flat conductors are sandwiched between insulating and/or shielding layers, have numerous desirable characteristics which have caused them to be used in satellite, missile and rocket systems, as well as in computer and data processing systems, etc. The beneficial properties of these cables relate to weight and cost reductions, space savings, current capacity, electrical characteristics, ease of handling, and others. However, and particularly where the insulating layers include a synthetic resin which is extremely tough and heat resistant, there has long existed a major problem relative to the making of electrical connections to the flat conductors in the cables. This problem pertains to the removal (stripping) of the insulating and/or shielding layers in order that welded or soldered (or other) connections can be made to the conductors. Prior-art stripping methods have not only been difficult but have often been characterized by likelihood of damage to the conductors and consequent generation of large amounts of scrap. The stripping problem has been so severe as to limit the extent of usage of flat cables, particularly in the less exotic electrical arts.

The extent of the stripping problem is evidenced by the disclosure of U.S. Pat. Nos. 3,261,239; 3,385,140; and 3,659,332, which patents teach attempted solutions of a cumbersome, inefective and/or conductor-damaging nature. The last-specified U.S. Pat. No. 3,659,322, employs an ultrasonic step but only in a liquid and after performance of heat-shielding and radiant energy steps. In different arts — not the removal of insulation from flat electrical conductors — the following patents are known to applicants: 2,421,319; 2,502,475; 3,086,288; 3,388,414; 3,468,384; 3,517,576; 3,526,219; 3,527,501; 3,604,520. Some of these patents relate to ultrasonic techniques and show that ultrasonic cutting has been known for several decades.

SUMMARY OF THE INVENTION

The present method and apparatus solve not only the insulation removal problem but also the problem of removing metal shielding, and permit rapid and easy stripping with no damage to the conductors. It is a very important feature of the method and apparatus that they are fully operative even on extremely tough and heat-resistant insulating materials such as the polyimide synthetic resins.

The method and apparatus relate to a tool tip which is ultrasonically excited, being first penetrated through the insulation (and shielding, if present) to the immediate vicinity of the conductor. Thereafter, the ultrasonic excitation is continued and the tip is skived relative to the conductor in order to effectively and thoroughly pare the insulation (and shielding) from any desired length thereof. The resulting chip is then removed in any of various ways.

The tip surface of the tool is substantially flat, is small in area, and is substantially parallel to the conductor surface, thus minimizing the possibility of damage to the conductors and also minimizing the power requirements of the system. The effectiveness of the method and apparatus is maximized, and the possibility of workpiece damage minimized, by causing the ultrasonic motion to be in a plane substantially parallel to the conductor surface.

DETAILED DESCRIPTION OF THE PREFERRED EMBODIMENT

Figures 1, 2:
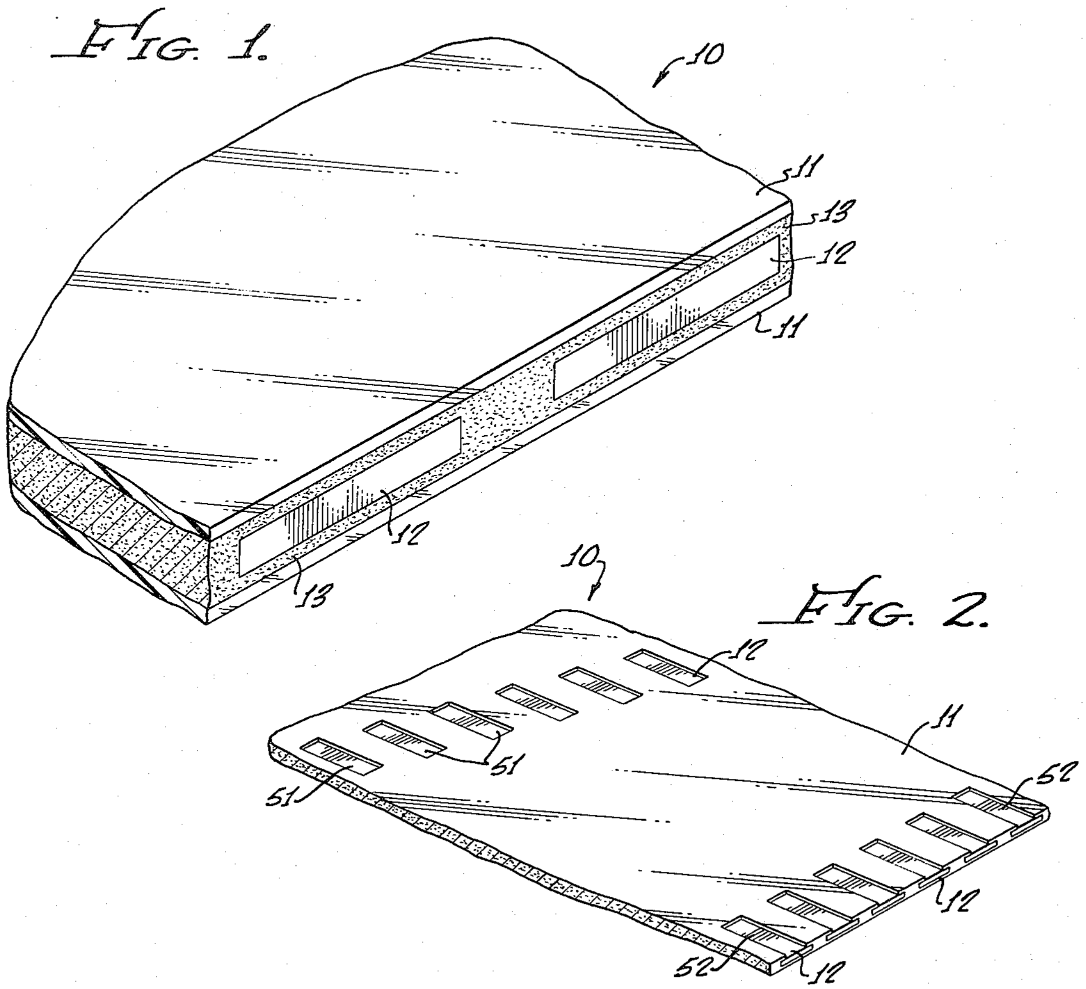
FIG. 1 is a greatly enlarged isometric view of an end region of a flat cable.
FIG. 2 is a less enlarged isometric view illustrating the cable of FIG. 1 after windows have been formed through the insulating layers.

The drawing, and most portions of the specification, illustrate and describe the method and apparatus as employed relative to a flat cable. It is emphasized, however, that the method and apparatus are also applicable relative to etched ("printed") circuits, microwave strip line components, interdigitated filters, integrated circuits, and similar circuits and components. The conductors in the flat cable, the etched ("printed") circuits, the integrated circuits, and similar circuits and components, may be referred to generically as "flat surfaced conductive elements."

The method and apparatus are shown and described herein relative to the removal of insulating and/or shielding layers from only one side of a flat-surfaced conductive element. It is to be understood, however, that by duplicating the described apparatus, and providing suitable cable support means, the insulation and/or shielding may be removed simultaneously from both sides of a flat-surfaced conductive element.

Various types of flat cables, including types which may be treated by the present method and apparatus, are described in some detail in Form No. CC1 4-72 promulgated by Hughes Aircraft Company of Los Angeles, California, under the heading "Hughes 'Contour' Cable." The disclosure of said Hughes bulletin is incorporated by reference herein as though set forth in full. The outer dielectric layers of such cables are normally polyimides, for example a polyimide known as "Kapton H-film." "Kapton" being a trademark of E. I. Dupont de Nemours and Co., Inc. Such films are extremely heat resistant, tough, and difficult to work with.

Beneath such outer layers, and enclosing the flat conductors themselves, is a bonding (and insulating) agent such as a type of "Teflon," another Dupont trademark. The "Teflon" is, more specifically, "Teflon" FEP (fluorinated ethylene propylene). In place of "Teflon" FEP, it is possible to employ other adhesive substances, for example modified epoxies. Other substances may also be employed in place of the "Kapton H-film," but these are less preferred because they are less heat resistant, etc.

The thickness of the "Kapton H-film" normally ranges between about 0.001 inch and 0.005 inch. The conductor thicknesses are generally between 0.001 inch and 0.125 inch. Where metal shielding is employed, the shielding thickness generally ranges between 0.0008 inch and 0.003 inch. The shielding is normally unplated copper. The conductors are also, frequently, unplated copper although the copper may be plated with nickel or silver.

Other types of dielectric and/or bonding materials which may be employed include polyester, polyolefin, and polycarbonate (for example "Lexan," a General Electric trademark).

Referring to FIGS. 1, 2, 5 and 6 of the drawings, a flat cable 10 is illustrated as comprising outer layers 11 of "Kapton H-film," parallel copper conductors 12 which lie in a single plane, each conductor being of rectangular section and flat, and bonding and insulating material 13 in the form of (for example) "Teflon" FEP. As one specific example, each outer layer 11 of the flat cable 10 may be 0.002 inch thick, each conductor 12 may be 0.005 inch thick, and the "Teflon" FEP 13 may be 0.002 inch thick except between the conductors where it is about 0.009 inch thick.

Figure 7:
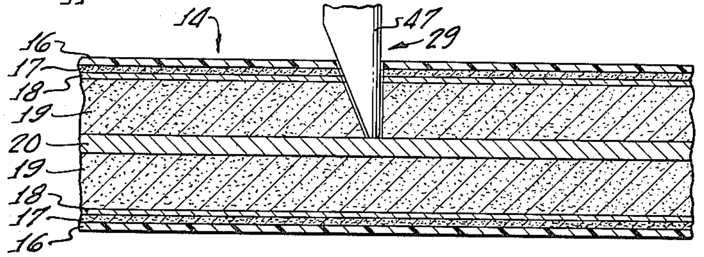
FIG. 7 corresponds to FIG. 5 but relates to a shielded cable, the cable and tool being less enlarged than in the showings of FIGS. 5 and 6.

Referring next to FIG. 7, there is illustrated (as an example) a shielded flat cable 14 having outer insulating and dielectric layers 16 of "Kapton H-film," outer bonding layers 17 of "Teflon" FEP or other suitable material, shield layers 18 of copper and which are continuous sheets as distinguished from being strips or bands, inner bonding layers 19, and a multiplicity of parallel flat silver plated copper conductors 20 which all lie in a single plane.

As a specific example and relative to FIG. 7, each layer 16 may be 0.002 inch thick, each layer 17 may be 0.002 inch thick, each shield layer 18 may be 0.0015 inch thick, each layer 19 may be 0.015 inch thick, and each conductor 20 may be 0.005 inch thick.

The above illustrations and examples are not given by way of limitation, but instead to illustrate the types of flat cables which may be treated by the present method and apparatus. As indicated previously, the flat conductors 12 and 20 may be replaced by various other flat surfaced conductive elements indicated above.

Figure 3:
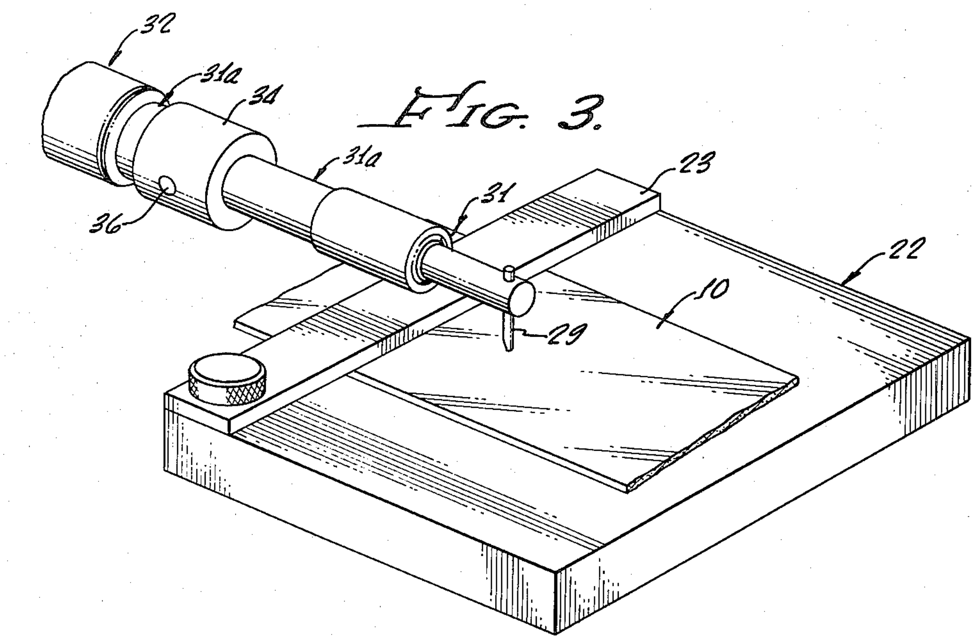
FIG. 3 is a schematic illustration of a portion of the present apparatus.
Figure 4:
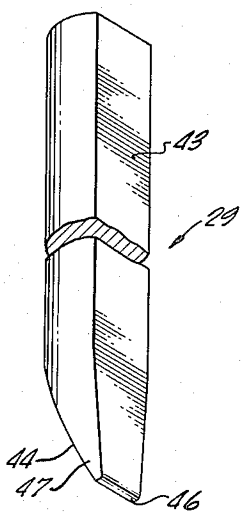
FIG. 4 is a greatly enlarged isometric view of the tool.
Figure 8:
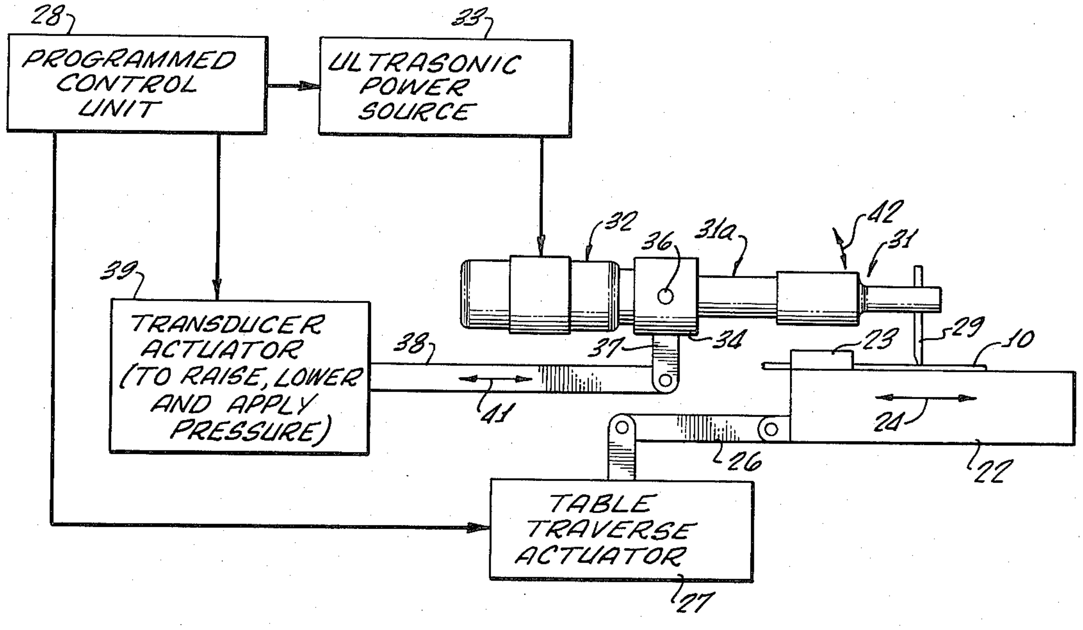
FIG. 8 is a schematic diagram of the apparatus.

Proceeding to a description of the apparatus, and referring first to FIGS. 3 and 8, there is illustrated schematically a flat table 22 on which the cable 10 is clamped as by a clamp structure 23. Table 22 is adapted to be traversed linearly, in the directions indicated by arrow 24, being connected through a link 26 to a table traverse actuator 27. When actuator 27 is operated, under the control of a programmed control unit 28, the table 22 moves (along the line indicated by arrow 24) a predetermined distance and at a predetermined speed in one direction or the other. The actuator

27 may also be adapted to shift table 22 along any other path, such as a curved path, this being effected (for example) when the flat surfaced conductive element is an etched circuit having a curved shape.

As an alternative, table 22 may be stationary and the actuator 27 may be adapted to traverse the ultrasonic apparatus.

The ultrasonic apparatus comprises a tool 29 which is fixedly mounted in a toolcone 31, the axis of the tool being substantially perpendicular to that of the toolcone. The toolcone 31 (which is a mechanical transformer as well as the tool holder) is connected coaxially (by a connector 31*a*) to an ultrasonic transducer 32 which generates ultrasonic mechanical vibrations when supplied with electric power from a suitable ultrasonic power source 33. Power source 33, and thus the remaining ultrasonic apparatus, are energized in response to commands from the above-indicated programmed control unit 28.

A pivotally-supported collar 34 is mounted around the connector 31*a*, being pivotally connected to a suitable support (not shown) for pivotal movement about a horizontal shaft or axis indicated at 36. A crank 37 extends downwardly from collar 34 and is pivotally connected by a link 36 which extends to a transducer actuator 39. Such actuator 39, like the actuator 27 and the power source 33, is controlled by the programmed control unit 28.

The actuator 39 is adapted to move link 38 generally horizontally, as indicated by the arrow 41, which in turn causes pivotal movement of crank 37 and collar 34 about shaft or axis 36. The toolcone 31 and tool 29 are thus moved upwardly and downwardly as indicated generally by the arrow 42. The transducer actuator 39 is adapted to apply predetermined amounts of force to link 38 in accordance with the signal received from control unit 26, thus determining the pressure exerted by the tip of tool 29.

The described ultrasonic assembly is adapted to cause longitudinal vibrations of toolcone 31, which in turn causes vibrations of the tool 29 in a direction parallel to arrow 24 (FIG. 8). Stated otherwise, the vibrations of the tip surface (extreme lower end) of the tool 29 are in a plane substantially parallel to the plane of conductors 12 (or other electrical components).

The ultrasonic power source 33 may operate, for example, at 60 kHz, thus causing corresponding 60 kHz ultrasonic mechanical vibrations in transducer 32 with resulting corresponding (but amplified) vibrations of the tip (extreme lower end) of tool 29. Numerous other ultrasonic frequencies may also be employed, for example in the range from 10 kHz to 200 kHz. The words "ultrasonic frequency," as employed in the present specification and claims, thus also include the upper regions of the sonic frequency range as well as frequencies not subject to auditory sensing.

Generator 33 preferably employs phaselock circuitry, in order to maximize the transmission of energy into transducer 32. The power capability of source 33 may be, for example, 10 watts.

The vibrations created in transducer 32 are magnified in toolcone 31 and again in tool 29. The peak vibrational amplitude at the tip of the tool may be, for example, 0.001 inch (so that the total vibrational amplitude, both directions, is 0.002 inch). Such amplitude may be varied as desired.

Referring next to FIGS. 4–7, inclusive, the tool 29 is (for example) formed of tungsten carbide, and is illustrated as being generally cylindrical in shape throughout the majority of the length thereof but having a flat front face 43. Other tool shapes and/or materials may be used. The lower end of face 43 may be inclined forwardly at a slight angle from the vertical. The rear of the tool, at the lower portion thereof, is inclined at a much greater angle from the vertical to form a rear face 44 which converges downwardly toward the front face 43.

The faces 43 and 44 should not intersect at a sharp edge but instead merge, through slight radii, with a lower face tip face 46 which is substantially flat and is substantially parallel to the upper surfaces of conductors 12 and 20.

Figure 5:
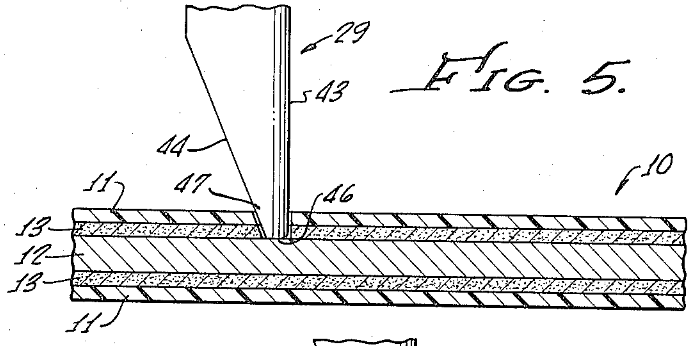
FIG. 5 is a greatly enlarged vertical section showing the positions of the parts after the tool tip has penetrated to the conductor surface.
Figure 6:
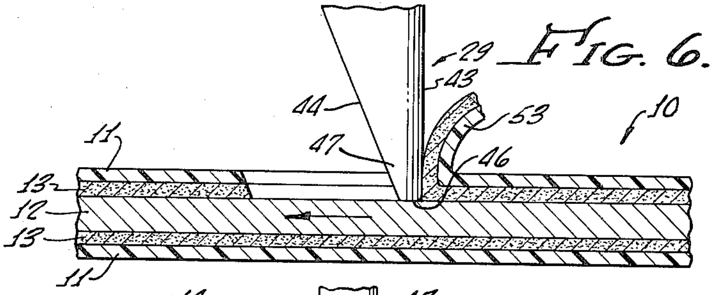
FIG. 6 corresponds to FIG. 5 but shows the positions of the parts after substantial completion of the skiving step.

It is to be understood that the illustrated apparatus is small, a typical length of the tool 29 being about 0.83 inch. The dimensions of surface 46, in a horizontal plane, may be (for example) 0.003 inch in a direction longitudinal to the conductors 12 as shown in FIGS. 5 and 6, and 0.05 inch in a horizontal plane and perpendicular to the conductors 12 (that is to say, in a direction into or out of the paper as viewed in FIGS. 5 and 6). The sides 47 (FIG. 4) of the tool converge towards each other in a downward direction.

DESCRIPTION OF THE METHOD

Let it first be assumed that the method is to be employed in the formation of windows 51 (FIG. 2) which are spaced from the end of cable 10, in order that a cross-wire conductor may be soldered, welded or otherwise electrically connected to the exposed flat conductors 12 in the cable.

The cable 10 is clamped firmly on the table 22, by the clamp means 23, and is so located that tool 29 is above the cable portion wherein a conductor 12 is to be partially exposed. The control unit 28 is less energized, and automatically effects operation of the ultrasonic power source 33 to create the above-described vibrations of the tool tip, including the substantially flat lower end surface 46 of the tip. In addition, unit 28 effects operation of transducer actuator 39 in such direction as to pivot the ultrasonically excited elements about axis 36 in order to cause the tip face 46 to engage the outer surface of layer 11 with a predetermined pressure.

The predetermined pressure, the amount of ultrasonic energy, the amplitude and frequency of ultrasonic vibrations, the area and shape of tip face 46, etc., are so related to the particular cable that the tool penetrates through both layers 11 and 13 and comes into substantially flatwise engagement (contact) with the upper surface of conductor 12 as shown in FIG. 5. The described penetration is the result of localized heating of layers 11 and 13 due to the ultrasonic vibrations and due to the downward pressure applied by transducer actuator 39. Stated more definitely, the downward pressure and the ultrasonic vibrations generate heat due to frictional and other effects, which heat is believed to cause sublimation and/or disintegration of the layer portions underlying the tip face.

The various factors are so regulated that the upper surface of conductor 12 will be engaged (contacted) and scrubbed by the ultrasonically excited tool face 46, but will not be damaged, nicked or fatigued thereby. The scrubbing action on the upper conductor surface prepares the same for welding or soldering, without requirement of any post-treatment step.

The penetration through layers 11 and 13 is so clean that there is no damage to surrounding dielectric and adhesive material, and no separation of such surrounding material from the upper conductor surface, this being of significance in order to prevent formation of cracks or pockets which may result in failures after each conductor 12 has been connected to other conductors.

Because of the relatively small cross-sectional area of tip face 46, the amount of downward pressure applied on the tool by transducer actuator 39 may be small, for example about 300 grams for a face of the size described in the above-stated specific example.

The above steps are preferably performed while the table 22 is stationary, it having been found that it is difficult and power wasting to effect initial penetration of the tool tip to the conductor 12, and initial scrubbing, while the table 22 is moving at a substantial speed relative to the tool. This initial penetration and scrubbing step, while table 22 (and thus cable 10) is stationary, may sometimes be referred to as the "penetration and dwell" portions of the method.

It is to be understood that if the tool tip were then merely removed from the cable 10, without performance of any subsequent skiving step as described below, there would exist a small window to which a small electrical connection could be made. Furthermore, it is to be understood that the area of tip face 46 may be increased, and the power in the system increased greatly, in order to cause such an initial window to be much larger than that described above.

At the end of a predetermined time period necessary for the described "penetration and dwell" step, the control unit 28 operates table traverse actuator 27 to shift table 22 and thus cable 10 toward the left as viewed in FIGS. 3, 6 and 8. The rate of table movement may be, for example, about 1 inch per second or faster, and is continued for a time period adapted to expose the required length of conductor 12.

Referring particularly to FIG. 6, the described table movement, combined with the ultrasonic vibration of the tool tip, causing peeling-off of a chip 53 (FIG. 6) formed by portions of both of the layers 11 and 13. Furthermore, the upper surface of conductor 12 is progressively scrubbed beneath face 46, to prepare it for welding or soldering. The surrounding material forming layers 11 and 13 is not damaged or separated from the conductor 12, but instead remains intact and terminates at a clean edge. During performance of the skiving step illustrated in FIG. 6, the axial pressure (caused by actuator 39) is maintained.

After a window 51 of desired length has thus been formed, control unit 28 operates actuator 27 in order to reverse the direction of travel of table 22 and cable 10, so that they return to their initial positions. If desired, the transducer actuator 39 and the ultrasonic power source 33 may be operated in order to maintain the tool pressure and/or ultrasonic vibration during such return-traverse step, so that a final scrubbing action is effected on the surface of the conductor 12. Alternatively, control unit 28 may be programmed to discontinue operation of source 33 and/or actuator 39 during return traverse of the table.

Since it is not normally desired that the chip 53 remain connected to layers 11 and 13, the method comprises removing this chip in one of a plurality of ways. For example, the chip may be cut off with a sharp blade which is passed over the surface of outer layer 11. Alternatively, the method may be conducted in such manner as to perform a "penetration and dwell" step at one point along the length of the conductor, following which the tool 29 is withdrawn and table 22 is traversed a distance equal to the desired length of window 51, following which a second "penetration and dwell" step is performed, following which the tool is skived along the conductor between the two small windows formed by the two penetration and dwell steps. In this manner, the chip is automatically severed since it only extends between the two preformed small windows.

Instead of causing the tip face 46 to come into actual contact with the upper surface of conductor 12, the method may be performed in such manner that a "divot" of "Kapton H-film" 11 is interposed between surface 46 and the upper conductor surface. Stated otherwise, the initial "penetration and dwell" step does not destroy the portion of the "Kapton H-film" 11 immediately beneath surface 46, but instead permits a severed divot of such film 11 to remain below face 46. The ultrasonic vibration then removes the portion of the inner film 13 below the tip face 46 and the severed divot, the result being that the tip face does not actually contact the conductor 12 but instead comes within a few thousandths of an inch thereof. The ultrasonically excited divot or pad then operates as a scrubbing implement relative to the conductor surface, and aids in preventing damage thereto.

After the first window 51 has been formed as described, the table 22 or the cable 10 is moved laterally a distance equal to the spacing between adjacent conductors 12, and the described process is repeated to form a second window 51. Of course, actuator 39 is operated to raise the tool 29 prior to such lateral movement.

In order to form an end termination opening 52 (FIG. 2) at the extreme end of cable 10, so that an end termination or connection may be made to a conductor 12, the same method is employed as described above except that there is no necessity of removing the chip 53 since the chip merely falls off when the end of conductor 12 is reached. The method is started, by performing the penetration and dwell step, at a location spaced from the extreme cable end by a distance equal to the desired length of opening 52. Relative traverse movement is then effected to skive the tool to the end of conductor 12.

Although the ultrasonic vibration of tip face 46 is caused to be in a plane substantially parallel to the conductor surface, such vibration need not be in a direction longitudinal to the conductor or parallel to the direction of table traverse. Thus, for example, the direction of ultrasonic vibration may be perpendicular, transverse or oblique to the conductor 12 and/or to the direction of traverse of table 22. As employed in the previous sentence, the expression "perpendicular . . . to the conductor 12" refers to a direction perpendicular to the plane of the paper in the showings of FIGS. 5–7.

The direction of traverse of table 22 (or of the ultrasonic apparatus) need not be longitudinal to the conductor 12, but may be in any desired direction. Thus, for example, a single window may be formed in a direction transverse to the various conductors 12, just as if all the windows 51 shown in FIG. 2 were laterally enlarged to form a single large window extending over the several conductors.

When the direction of table traverse is not such that the tip face 46 remains in engagement with conductor 12, the method contemplates taking steps to prevent the tool tip from "falling off" the side of any conductor, into a gap between adjacent conductors. For example, the transducer actuator 39 and/or the control unit 28 may be so operated that tip face 46 will not penetrate below the common plane of the upper surfaces of all conductors 12. Alternatively, suitable stop means (not shown may be provided to prevent penetration of the tip face 46 below the plane of the upper surfaces of conductors 12.

Referring next to FIG. 7, the method is performed relative to the shielded cable 14 the same as relative to the unshielded cable 10. Depending upon various factors, primarily the thickness and composition of the shield layer 18, the amount of penetration pressure applied by transducer actuator 39 is usually increased substantially over that described above, for example to approximately 1000 grams when the shield layer 18 is copper and is 0.0015 inch thick. During the traverse or skiving portion of the method, a chip (not shown) is pared away from each conductor 20 (FIG. 7) in order to form a window or opening thereabove.

It is emphasized that the recited pressures, etc., are given by way of example only, in order to illustrate how the method is performed relative to certain types of cables. The area and shape of the tip face, the amount of penetration of pressure, the amount of ultrasonic vibrational energy, the vibrational frequency and amplitude, etc., are correlated to the particular cable or other electrical element in such manner that the tip face 46 penetrates into proximity with the upper surface of the underlying flat-surfaced conductive element, and causes ultrasonic scrubbing of such surface to prepare the same for welding or soldering, without effecting any substantial damage thereto. The combined skiving and scrubbing step is then performed (using the proper traverse rate, pressure, vibrational frequency and amplitude, etc.) to expose any desired length of conductor. By employing the princples described in the present specification, an operator can readily adapt the various factors for different types of cables and other elements.

One advantage of the present method is that the heating effect caused by the ultrasonically vibrating tool is highly localized, being readily confined to the desired area. Thus, as above-noted, surrounding portions of the layers of insulating and adhesive material (and shielding material) are not damaged of adversely affected. A further major advantage is that the ultrasonic vibration permits stripping of conductors which are protected by the very tough and heat-resistant polyimide family of films, it being understood that use of this type of film is important in order to provide a cable having excellent characteristics relative to high temperature stability, etc.

It is within the scope of the method to vary the amount of ultrasonic energy, the vibrational frequency or amplitude, and/or the penetration pressure created by actuator 39, employed during the "penetration and dwell" step as compared to the skiving step. For example, more ultrasonic energy and/or penetration pressure may be employed during the penetration and dwell step than during skiving, particularly when the method is performed relative to a shielded cable as described relative to FIG. 7. Furthermore, the amount of penetration pressure and/or the amount of ultrasonic energy may be reduced, automatically by the control unit 28, after the face 46 penetrates shield layer 18 and before it contacts conductor 20.

A typical level of operating power in source 33, in a system of the indicated size, may be about 5 watts.

The above-described "penetration and dwell" step may also be performed with a "cookie cutter" shaped tool which removes material (for example, "Kapton H-film") around a predetermined perimeter of predetermined shape and size. After this material ("Kapton H-film") has been removed, any residual adhesive may be removed manually, ultrasonically, chemically or by other means.

In performing a typical method, for example as described relative to FIGS. 5 and 6, the penetration and dwell step may take 0.3 second. The time required for the remainder of the cycle varies in accordance with the length of the opening or window (at, for example, a skiving rate of 1 inch per second).

The foregoing detailed description is to be clearly understood as given by way of illustration and example only, the spirit and scope of this invention being limited solely by the appended claims.

We claim:

1. A method of removing covering layer means, including a synthetic resin dielectric, from a flat surface of an electrically conductive element, which comprises:

a. providing a tool having a tip portion shaped to penetrate said covering layer means, b. causing said tip portion to vibrate at an ultrasonic frequency, c. penetrating said ultrasonically vibrating tip portion through the covering layer means, including a synthetic resin dielectric, over a flat surface of an electrically conductive element, and d. cleaning a portion of said flat surface at the penetrated region of said covering layer means, to prepare said surface portion for making of an electrical connection thereto.

2. The invention as claimed in claim 1, in which said method further comprises performing said cleaning step (d) by causing said ultrasonically vibrating tip portion to effect ultrasonic scrubbing of said surface portion.

3. The invention as claimed in claim 2, in which said method further comprises causing the end surface of said tip portion to be substantially flat, and to be substantially parallel to said flat surface to said conductive element during said scrubbing step.

4. The invention as claimed in claim 2, in which said method further comprises causing said end surface of said tip portion to be substantially flat, and to be substantially parallel to said flat surface of said conductive element during said scrubbing step, and further comprises causing said ultrasonic vibrations of said flat surface of said tip portion to be in a plane substantially parallel to said flat surface of said conductive element.

5. The invention as claimed in claim 1, in which said method further comprises causing said ultrasonic vibrations of said tip portion to be in a plane substantially parallel to said flat surface of said conductive element.

6. The invention as claimed in claim 1, in which said method further comprises performing said penetration step (c) by applying pressure to said tip portion, the amount of said applied pressure being sufficient to cause said ultrasonically vibrating tip portion to penetrate said covering layer means, but insufficient to cause damage to said conductive element.

7. The invention as claimed in claim 1, in which said method further comprises causing said penetration to occur in a direction substantially perpendicular to said flat surface, and in the absence of traverse movement between said tip portion and said electrically conductive element.

8. The invention as claimed in claim 1, in which said method is performed relative to a covering layer means comprising a polyimide resin which is bonded to said flat surface of said electrically conductive element.

9. The invention as claimed in claim 1, in which said method is performed relative to a covering layer means comprising at least one layer of a tough, heat-resistant insulating synthetic resin which is bonded to said flat surface of said electrically conductive element.

10. The invention as claimed in claim 1, in which said method is performed relative to a covering layer means comprising a layer of shielding metal.

11. The invention as claimed in claim 1, in which said method is performed relative to a flat electrical cable having a multiplicity of conductors the flat surfaces of which lie in a common plane, said covering layer means on said flat surfaces comprising an outer layer of a polyimide resin and which is bonded to said flat surfaces.

12. A method of preparing a portion of a flat electrical cable for making an electrical connection thereto, said flat cable comprising a multiplicity of parallel flat conductors, an outer layer of a polyimide synthetic resin, and an intermediate layer of a bonding synthetic resin effecting adherence of said outer polyimide layer to the flat surfaces of said conductors, said method comprising:

a. providing a tool having a tip portion shaped to penetrate said layers of polyimide synthetic resin and bonding synthetic resin,
said tip portion having a surface which is substantially flat, b. causing said tip portion to vibrate at an ultrasonic frequency and in a plane substantially parallel to said flat surface of said tip portion, c. applying pressure to said tool to cause said vibrating tip portion thereof to penetrate through said polyimide synthetic resin layer and said bonding synthetic resin layer and into proximity with the flat surface of one of said conductors,
the orientation of said tool relative to said conductors being such that said flat surface of said tip portion is substantially parallel to said flat surface of said one conductor after said tool is penetrated into proximity with said flat surface of said one conductor, and d. causing said flat surface of said tip portion to cause ultrasonic scrubbing of at least part of said flat surface of said one conductor,
whereby said part is prepared for making of an electrical connection to another conductor.

13. The invention as claimed in claim 12, in which said method further comprises effecting said penetrating step by applying sufficient pressure to cause said ultrasonically vibrating tip portion to penetrate said polyimide layer and said bonding layer but insufficient to cause said vibrating tip portion to damage said conductive element, and in which said method further comprises causing said penetration to occur in the absence of substantial relative traverse movement between said tip portion and said flat cable.

14. A method of removing covering layer means, including a heat-resistant synthetic resin dielectric, from a flat surface of an electrically conductive element, which comprises:

a. providing a tool having a tip portion shaped for skiving movement over the flat surface of an electrically conductive element without effecting damage to such element, b. causing said tip portion to vibrate at an ultrasonic frequency, c. causing the directions of the ultrasonic vibrations, and the amplitude and power thereof, to be such that skiving movement of said tip portion over said surface will peel off said covering layer means, including a heatresistant synthetic resin dielectric, without causing damage to said electrically conductive element, and d. effecting relative traverse movement between said tool and said surface to cause said tip portion to traverse said surface in a skiving manner and thus to peel off a chip of said covering layer means including a heat-resistant synthetic resin dielectric.

15. The invention as claimed in claim 14, in which said method further comprises performing said step (d) in such manner that said surface will be ultrasonically scrubbed in response to said ultrasonic vibrations of said tip portion, whereby to prepare said flat surface for making of an electrical connection thereto.

16. The invention as claimed in claim 14, in which said method further comprises causing said tip portion to be in contact with said surface during performance of said step (d).

17. The invention as claimed in claim 14, in which said method further comprises performing said step (c) in such manner that said ultrasonic vibrations of said tip portion are in a plane substantially parallel to said surface during performance of said step (d).

18. The invention as claimed in claim 14, in which said method further comprises causing a surface of said tip portion to be relatively flat, and to be substantially parallel to said surface of said conductive elements during performance of said step (d).

19. The invention as claimed in claim 14, in which said method further comprises causing a surface of said tip portion to be substantially flat, and to be substantially parallel to said surface of said conductive element during performance of said step (d), and further comprises causing said ultrasonic vibrations of said tip portion to be in a plane substantially parallel to said surface of said conductive element.

20. The invention as claimed in claim 14, in which said method is performed relative to a covering layer means comprising a polyimide resin which is bonded to said flat surface of said electrically conductive element.

21. The invention as claimed in claim 14, in which said method is performed relative to a covering layer means comprising at least one layer of a tough, heat-resistant insulating resin, and also comprising a layer of shielding metal, said layer of tough resin and said layer of shielding metal being bonded to each other and to said flat surface of said electrically conductive element.

22. The invention as claimed in claim 14, in which said method is performed relative to a flat electrical cable having a multiplicity of conductors the flat surfaces of which lie in a common plane, said covering layer means on said flat conductor surfaces comprising an outer layer of a polyimide resin and which is bonded to said flat surfaces.

23. A method of preparing a portion of a flat electrical cable for making of an electrical connection thereto, said flat cable comprising a multiplicity of parallel flat conductors, an outer layer of a polyimide synthetic resin, and an intermediate layer of a bonding synthetic resin adapted to effect adherence of said outer polyimide layer to the flat surfaces of said conductors, said method comprising:

a. providing a tool having a tip portion shaped for skiving movement along the surface of a flat conductor in said flat electrical cable comprising a multiplicity of parallel flat conductors, an outer layer of a polyimide synthetic resin, and an intermediate layer of a bonding synthetic resin adapted to effect adherence of said outer polyimide layer to the flat surfaces of said conductors,
said tip portion having an end surface which is relatively flat, b. causing said tip portion to vibrate at an ultrasonic frequency and in a plane substantially parallel to said flat end surface of said tip portion, c. effecting a skiving motion of said tool along a desired region of a flat surface portion of at least one of said flat conductors to thereby peel therefrom a chip formed of part of said polyimide layer and part of said bonding layer,
the orientation of said tool relative to said conductor surface portion being such, during said skiving movement, that said flat end surface of said tip portion is substantially parallel to said conductor surface portions, and d. regulating the rate of said skiving movement and other factors in such manner that said flat end surface of said tip portion effects ultrasonic scrubbing of said conductor surface portion to thereby prepare the same for making of an electrical connection thereto.

24. A method of removing layer means, including a synthetic resin dielectric, from the flat surface of an electrically conductive element, which comprises:

a. providing a tool the tip of which is adapted to penetrate said layer means including a synthetic resin dielectric, b. ultrasonically exciting said tool to effect ultrasonic vibrations of said tip thereof, c. penetrating said ultrasonically vibrating tip through said layer means, including a synthetic resin dielectric, into proximity with said flat surface of said conductive element, and d. traversing said ultrasonically vibrating tip of said conductive element relative to each other while maintaining said tip in proximity with said flat surface,
whereby to skive a chip of said layer means from said flat surface.

25. The invention as claimed in claim 24, in which said method further comprises completing said penetrating step (c) prior to commencement of said traversing step (d).

26. The invention as claimed in claim 24, in which said method further comprises causing said tip to remain in proximity with the part of said flat surface from which said chip was skived, for time periods sufficient to scrub said part ultrasonically and thereby prepare the same for making of welded or soldered electrical connections thereto.

27. The invention as claimed in claim 24, in which said method further comprises causing said ultrasonic vibrations of said tip to be in a plane which is substantially parallel to said flat surface when said tip is in proximity with said surface.

28. The invention as claimed in claim 24, in which said method further comprises causing the end surface of said tip to be substantially flat, and causing said flat tip end surface to be substantially parallel to said flat surface of said conductive element when said tip end surface is in proximity with said conductive element surface.

29. The invention as claimed in claim 24, in which said method further comprises causing said ultrasonic vibrations of said tip to be in a plane which is substantially parallel to said flat surface of said conductive element when said tip is in proximity therewith, causing the end surface of said tip to be substantially flat, and causing said flat tip end surface to be substantially parallel to said flat surface of said conductive element when said tip end surface is in proximity with said conductive element surface.

30. The invention as claimed in claim 24, in which said method is performed relative to layer means comprising a sheet of a polyimide resin bonded to said electrically conductive element.

31. The invention as claimed in claim 24, in which said method is performed relative to layer means comprising a shielding layer formed of metal and bonded to said electrically conductive element.

32. A method of preparing a portion of a flat electrical cable for making of an electrical connection thereto, said flat cable comprising a multiplicity of parallel flat conductors, an outer layer of a polyimide synthetic resin, and an intermediate layer of a bonding synthetic resin adapted to effect adherence of said outer polyimide layer to the flat surfaces of said conductors, said method comprising:

a. providing a tool having a tip portion shaped to penetrate said layers of polyimide synthetic resin and bonding synthetic resin,
   said tip portion having an end surface which is substantially flat, b. causing said tip portion to vibrate at an ultrasonic frequency and in a plane substantially parallel to said flat end surface, c. applying pressure to said tool to cause said vibrating tip portion thereof to penetrate through said polyimide layer and said bonding layer and into proximity with the flat surface of one of said conductors,
   the orientation of said tool relative to said conductor being such that said flat end surface of said tip portion is substantially parallel to said flat surface of said conductor after said tool has penetrated into proximity with said flat surface of said conductor, d. causing said flat end surface of said tip portion to cause ultrasonic scrubbing of at least part of said flat surface of said conductor,
   whereby said part is prepared for making of a electrical connection to another conductor, and e. effecting relative traversing movement between said tip portion and said conductor while causing said flat end surface of said tip portion to remain substantially parallel with said flat conductor surface and in proximity with said surface,
   said traversing movement being effected at a rate sufficiently slow to cause ultrasonic scrubbing of the conductor surface therebeneath to prepare the same for making of a soldered or welded connection to another conductor, said traversing movement effecting skiving of a chip comprising parts of said polyimide layer and said bonding layer.

33. The invention as claimed in claim 32, in which said method is performed relative to a flat cable which comprises not only said polyimide layer and said bonding layer but also a layer of shielding metal, and in said step (c) comprises applying sufficient pressure to said tool to cause said vibrating tip portion thereto to penetrate through all of said layers.

* * * * *